US012503834B2

(12) United States Patent
Nakajima et al.

(10) Patent No.: US 12,503,834 B2
(45) Date of Patent: Dec. 23, 2025

(54) RELIEF SET-PRESSURE ADJUSTMENT SYSTEM

(71) Applicant: Caterpillar SARL, Geneva (CH)

(72) Inventors: Hideki Nakajima, Akashi (JP); Shino Sako, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 18/420,974

(22) Filed: Jan. 24, 2024

(65) Prior Publication Data

US 2024/0279912 A1 Aug. 22, 2024

(30) Foreign Application Priority Data

Jan. 24, 2023 (JP) ................................ 2023-008580

(51) Int. Cl.

| | |
|---|---|
| ***E02F 9/22*** | (2006.01) |
| ***F15B 19/00*** | (2006.01) |
| *E02F 9/26* | (2006.01) |

(52) U.S. Cl.

CPC .......... *E02F 9/2228* (2013.01); *E02F 9/2292* (2013.01); *E02F 9/2296* (2013.01); *F15B 19/002* (2013.01); *E02F 9/2267* (2013.01); *E02F 9/2278* (2013.01); *E02F 9/267* (2013.01); *F15B 2211/20546* (2013.01);

(Continued)

(58) Field of Classification Search

CPC ..... E02F 9/2228; E02F 9/2292; E02F 9/2296; F15B 19/002; F15B 2211/20546; F15B 2211/20576; F15B 2211/50518; F15B 2211/526; F15B 2211/6651; F15B 2211/6652; F15B 2211/85

See application file for complete search history.

(56) References Cited

U.S. PATENT DOCUMENTS

| | | | | |
|---|---|---|---|---|
| 3,446,020 A * | 5/1969 | Stephens et al. | ....... | F16H 61/46 60/447 |
| 4,212,323 A * | 7/1980 | Qureshi | ............. | F15B 13/0402 137/625.61 |

(Continued)

FOREIGN PATENT DOCUMENTS

| | | |
|---|---|---|
| JP | H1194105 A | 4/1999 |
| JP | 2003185042 A | 7/2003 |

(Continued)

*Primary Examiner* — Dustin T Nguyen

(57) ABSTRACT

Problem: In a hydraulic system in which a manual line relief valve that adjusts the relief setting pressure is arranged in the line relief oil path formed by branching from the actuator line from the control valve to the hydraulic actuator, the relief setting pressure adjustment operation of the line relief valve can be performed independently with good accuracy. Solution: A controller 20 for controlling a perform of a relief setting pressure adjustment operation of a line relief valve 25 is provided with a pump flow control means that controls the pump flow rate during the relief setting pressure adjustment operation, an instruction command output means 54 that instructs a perform of the relief setting pressure adjustment operation by a manual operation, and a notification command output means 55 that notifies that the pump pressure detected by a pressure sensor 31 during the relief setting pressure adjustment operation is within a predetermined range of the target relief setting pressure.

3 Claims, 10 Drawing Sheets

(52) U.S. Cl.
CPC ............... *F15B 2211/20576* (2013.01); *F15B 2211/50518* (2013.01); *F15B 2211/526* (2013.01); *F15B 2211/6651* (2013.01); *F15B 2211/6652* (2013.01); *F15B 2211/85* (2013.01)

(56) References Cited

U.S. PATENT DOCUMENTS

| | | | | | |
|---|---|---|---|---|---|
| 4,619,186 | A * | 10/1986 | Walters | G05D 16/2097 | 91/459 |
| 5,460,355 | A * | 10/1995 | Danek | F16F 9/516 | 267/221 |
| 5,537,819 | A * | 7/1996 | Kobayashi | F15B 11/04 | 60/459 |
| 7,810,321 | B2 * | 10/2010 | Yamashita | E02F 9/2285 | 60/429 |
| 8,387,289 | B2 * | 3/2013 | Hanakawa | E02F 9/2242 | 37/348 |
| 9,458,840 | B2 * | 10/2016 | Azuma | E02F 9/2296 | |
| 10,788,132 | B2 * | 9/2020 | Tichy | F16K 11/02 | |
| 11,613,453 | B2 * | 3/2023 | Weiss | B66F 9/22 | 73/1.66 |
| 2024/0279901 | A1 * | 8/2024 | Henn | E02F 9/2228 | |

FOREIGN PATENT DOCUMENTS

| | | | |
|---|---|---|---|
| JP | 4458083 | B2 | 4/2010 |
| JP | 5500651 | B2 | 5/2014 |
| JP | 6347936 | B2 | 6/2018 |

* cited by examiner

RELIEF SET-PRESSURE ADJUSTMENT SYSTEM

CROSS-REFERENCE TO RELATED APPLICATION

This application claims priority under 35 USC § 119 and the Paris Convention to Japan Patent Application 2023-008580 filed on Jan. 24, 2023.

TECHNICAL FIELD

The present invention relates to a technical field of relief setting pressure adjustment system of a line relief valve provided in a hydraulic system of a working machine such as a hydraulic shovel.

BACKGROUND

Generally, a hydraulic system of a work machine such as a hydraulic shovel is provided with a hydraulic pump, a hydraulic actuator that drives the hydraulic pump as a hydraulic supply source, a control valve that controls the supply of oil to the hydraulic actuator and is disposed in an oil supply path from the hydraulic pump to the hydraulic actuator, and the like. In addition, in order to limit the maximum pressure on the individual hydraulic actuators, a line relief oil path is formed by branching itself from the actuator line from the control valve to the hydraulic actuator, and a line relief valve is generally arranged in the line relief oil path. In this case, the relief setting pressure of the line relief valve is set according to the maximum pressure allowed by the individual hydraulic actuator, but the initially set relief setting pressure may be reduced due to aging changes such as wear of the valve body that constitutes the line relief valve and spring movement. When the relief setting pressure of the line relief valve decreases, the pressure of the hydraulic actuator decreases and the work efficiency decreases. Therefore, it is necessary to adjust the relief setting pressure of the line relief valve according to the age.

Therefore, in order to cope with the decrease in the relief setting pressure due to the aging of the relief valve that limits the maximum pressure of the pump oil circuit, the relief valve is equipped with a pressure regulating piston, and at the same time, an electromagnetic proportional valve that supplies a control pressure to the pressure regulating piston based on a control command output from the controller is provided. When the pressure of the pump oil circuit in the relief state differs from the initial relief setting pressure, a technique is also known that enables the relief setting pressure of the relief valve to be adjusted by supplying a control pressure from the electromagnetic proportional valve to the pressure regulating piston (see, for example, Patent Document 1).

In addition, in order to easily change the relief setting pressure of the line relief valve, a relief pressure variable cylinder is provided in the line relief valve, and an electromagnetic proportional valve is provided to supply a control pressure (setting change pressure) to the relief pressure variable cylinder based on a control command output from the controller. When changing the relief setting pressure of the line relief valve, a technique is also known that enables the relief setting pressure of the line relief valve to be changed by supplying the control pressure from the electromagnetic proportional valve to the relief pressure variable cylinder (see, for example, Patent Document 2).

On the other hand, as a line relief valve, a technique is also known that uses an electromagnetic relief valve that can change the relief setting pressure according to the current supplied from the controller (see, for example, Patent Document 3).

PRIOR ART DOCUMENTS

Patent Documents

Patent Document 1: JP 1999-94105A
Patent Document 2: JP 2003-185042A
Patent Document 3: JP 6347936B

SUMMARY OF THE INVENTION

Problems to be Solved by the Invention

In each of the Patent Documents 1 and 2, a special structure with a pressure regulating piston or a relief pressure variable cylinder that is operated by a control pressure is used as a relief valve or a line relief valve, and an electromagnetic proportional valve that supplies a control pressure to the pressure regulating piston or the relief pressure variable cylinder based on a control command output from the controller is provided. Also, Patent Document 3 uses an electromagnetic relief valve that can change the relief setting pressure based on the control command output from the controller. In other words, all of the Patent Documents 1 to 3 use a solenoid valve controlled by a controller.

However, especially in line relief valves, manual relief valves (relief valves that can change the relief setting pressure by manually adjusting the spring force by means of turning the adjustment handle), which are advantageous in terms of cost, are often used. In such a manual relief valve, since the relief setting pressure cannot be adjusted based on the control commands from the controller as described in Patent Documents 1 to 3, when adjusting the relief setting pressure, the relief setting pressure must be adjusted by manual operation while the actuator line from the control valve to the hydraulic actuator is in the relief state with the operation of the hydraulic actuator operating tool. Therefore, at least two or more personnel are required, and there is a problem that it is difficult to accurately control the supply flow rate to the relief valve when it is in the relief state. Therefore, even if a manual relief valve is used as a line relief valve, there is a desire to easily and accurately adjust the relief setting pressure, and here is a problem to be solved by the present invention.

Means for Solving the Problem

The invention has been devised to solve these problems in light of the above-described realities, wherein the invention provides a relief setting pressure adjustment system, in a hydraulic system of a working machine including a variable capacity hydraulic pump, a hydraulic actuator using the hydraulic pump as a hydraulic supply source, a control valve arranged in an oil supply path from the hydraulic pump to the hydraulic actuator to control oil supply to the hydraulic actuator, and a manual line relief valve arranged in a line relief oil path formed by branching from an actuator line from the control valve to the hydraulic actuator to the oil tank, a control device that controls to assist an adjustment operation of the relief setting pressure of the line relief valve by the manual operation, and a pump pressure detection means that detects pump pressure of the hydraulic pump and outputs the detected pump pressure to the control device, are provided, wherein the control device comprises a target value setting means for setting target relief setting pressure and a target flow rate of the line relief valve, a pump flow rate control means for controlling the pump flow rate of the hydraulic pump to discharge the target flow rate from the line relief valve during the relief setting pressure adjustment operation of the line relief valve, an instruction command output means for instructing the perform of the relief setting pressure adjustment operation of the line relief valve by an manual operation, and a notification command output means for notifying that the pump pressure input from the pump pressure detecting means is within a predetermined range of the target relief setting pressure during the relief setting pressure adjustment operation.

In some embodiments, the hydraulic system of the work machine further comprises a main relief valve formed by branching from a pump oil path from the hydraulic pump to the control valve and arranged in the main relief oil path to the oil tank, and the control device comprises a main relief setting pressure control means for controlling the relief setting pressure of the main relief valve to be higher than the target relief setting pressure of the line relief valve by predetermined pressure or more during the relief setting pressure adjustment operation of the line relief valve.

In some embodiments, the control device comprises a pump capacity control means for controlling a pump capacity of the hydraulic pump and an engine rotation rate control means for controlling an engine rotation rate which is a driving source of the hydraulic pump, and the pump flow rate control means controls the pump flow rate of the hydraulic pump by adjusting the engine rotation rate by the engine rotation rate control means in a state in which a capacity of the hydraulic pump is fixed to a minimum capacity at the relief setting pressure adjustment operation of the line relief valve.

In some embodiments, the hydraulic system of the working machine comprises a plurality of hydraulic pumps, and the control device performs control to merge and supply the pump flow of the plurality of hydraulic pumps to the line relief valve when performing the relief setting pressure adjustment operation according to the target flow rate set for each line relief valve.

Effect of the Invention

The invention described herein makes it possible to easily perform the relief setting pressure adjustment operation of the line relief valve independently, which can greatly contribute to improving the work efficiency of the adjustment operation, and can also contribute to improving the accuracy of the relief setting pressure adjustment.

The invention described herein makes it possible to reliably avoid the problem that the main relief valve leaks beforehand when adjusting the setting pressure of the line relief valve.

The invention described herein makes it possible to perform the pump flow control with good accuracy, which can greatly contribute to improving the accuracy of relief setting pressure adjustment.

The invention described herein can perform the relief setting pressure adjustment operation without hindrance, even if the hydraulic actuator requires a pressurized oil supply flow rate from a plurality of hydraulic pumps.

DETAILED DESCRIPTION

Embodiments of the present invention will be described below with reference to the drawings.

Figure 1:
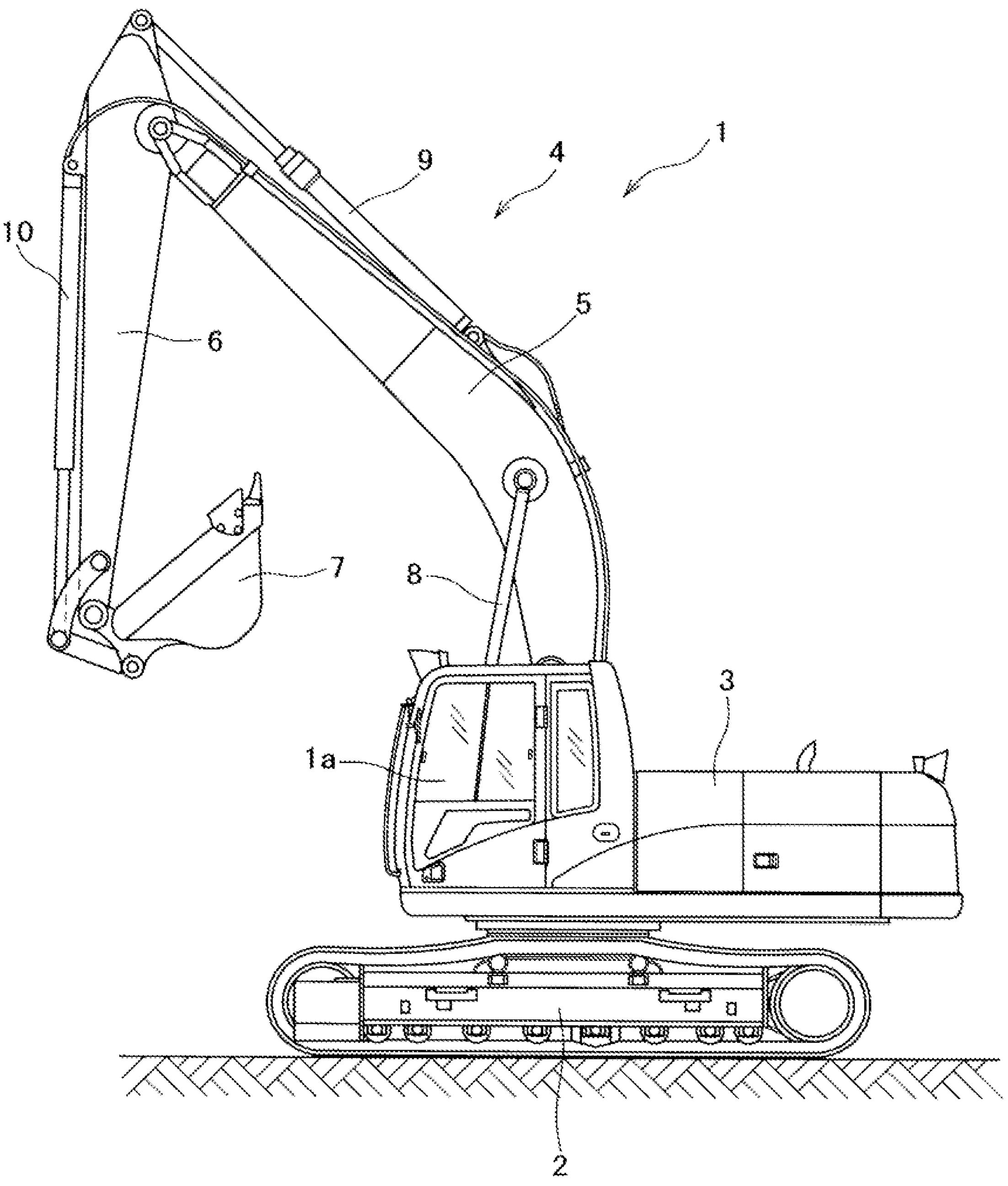
FIG. 1 is a side view of a hydraulic shovel.

FIG. 1 is a side view of a hydraulic shovel 1, which is an example of a working machine of the present invention. The hydraulic shovel 1 comprises a crawler type lower traveling body 2, an upper rotating body 3 rotatably supported above the lower traveling body 2, a front working machine 4 mounted on the upper rotating body 3 and the like. The front working machine 4 is constituted by a variety of members such as provided with a boom 5, whose base end is freely supported by the upper rotating body 3 in a vertically swinging manner; a stick 6 which is freely supported on the front end of the boom 5, which is rotatably supported by the front and rear sides of the boom 5 in a front-and-back swinging manner, and a bucket 7 which is freely swingingly mounted on the front end of the stick 6. Further, the hydraulic shovel 1 is provided with various hydraulic actuators, including a left-and-right traveling motor (not shown) for traveling the lower traveling body 2, a rotating motor (not shown) for traveling the upper rotating body 3, a boom cylinder 8 for telescopic operation to swing the boom 5, a stick cylinder 9 for telescopic operation to swing the stick 6, a bucket cylinder 10 for telescopic operation to swing the bucket 7, and the like.

Figure 2:
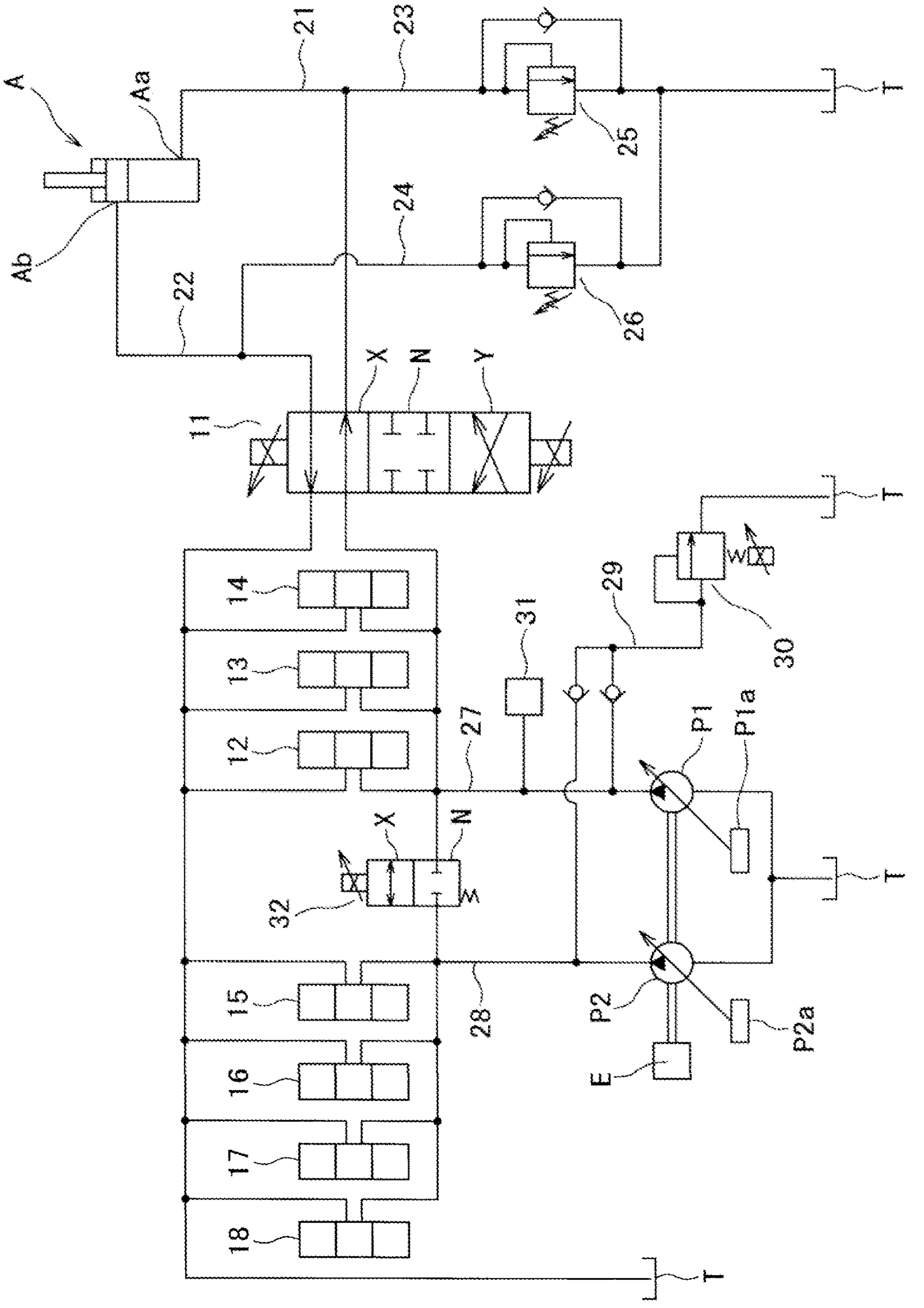
FIG. 2 is a hydraulic circuit diagram illustrating a part of a hydraulic system of a working machine.

FIG. 2 shows a partial schematic diagram of the hydraulic system provided in the hydraulic shovel 1. In FIGS. 2, P1 and P2 are driven by an engine E; a variable-capacity hydraulic pump P1*a* and P2*a* serve as hydraulic supply sources for various hydraulic actuators provided in the hydraulic shovel 1, and are variable-capacity means of the hydraulic pumps P1 and P2; T is an oil tank; A is a hydraulic actuator (e.g., stick cylinder 9, bucket cylinder 10, etc.) as an example of the various hydraulic actuators; 11 is a control valve arranged in a hydraulic oil supply path from the hydraulic pump P1 to the hydraulic actuator A to control the oil supply to the hydraulic actuator A, and 12 to 18 are control valves used for other hydraulic actuators (hydraulic actuators other than the hydraulic actuator A among the various hydraulic actuators, not shown in FIG. 2) to control the oil supply from the hydraulic pump P1, P2 to the other hydraulic actuators.

The control valve 11 is an electromagnetic directional switching valve and is configured to switch from a neutral position N in which oil is not discharged to the hydraulic actuator A to an operating position X or Y in which oil is discharged to the hydraulic actuator A based on a control command from the controller (equivalent to the control device of the present invention) 20 which will be described later. Note that FIG. 2 shows a state in which the control valve 11 is located in the operating position X. In addition, the control valves 12 to 18 for other hydraulic actuators are similarly electromagnetic directional switching valves that switch to a neutral position and an operating position based on control commands from the controller 20, but are simplified and illustrated in FIG. 2.

Furthermore, in FIGS. 2, 21 and 22 are actuator lines from the control valve 11 to the input/output ports Aa, Ab of the hydraulic actuator A, and in the actuator lines 21 and 22, the line relief oil paths 23, 24 leading to the oil tank T are branched. Then, these line relief oil paths 23, 24 are respectively provided with line relief valves 25, 26 that limit the maximum pressure of the actuator lines 21, 22, that is, the maximum supply pressure to the hydraulic actuator A. These line relief valves 25, 26 use a manual relief valve that can change the relief setting pressure by manually turning the adjustment handle to adjust the spring force.

Note that the line relief oil path is similarly formed by branching the actuator line from the control valves 12 to 18 for other hydraulic actuators to other hydraulic actuators, and the line relief oil path is provided with a manual line relief valve, but is omitted in FIG. 2.

Furthermore, in FIGS. 2, 27 and 28 are pump oil paths that supply the discharged oil of the hydraulic pumps P1 and P2 to the control valves 11, and the control valves 12 to 18 for other hydraulic actuators, and the main relief oil path 29 from the pump oil paths 27 and 28 to the oil tank T are branched. Then, the main relief oil path 29 is provided with a main relief valve 30 that limits the maximum pressure of the pump oil paths 27, 28. In the present embodiment, the main relief valve 30 uses an electromagnetic relief valve that can change the relief setting pressure with a control command from the controller 20. In addition, in FIG. 2, 31 is a pressure sensor (equivalent to the pump pressure detection means of the present invention) that detects the pressure of the pump oil path 27 (the pump pressure of the hydraulic pump P1).

Furthermore, in FIG. 2, 32 is an electromagnetic merging valve arranged in a communication oil path that communicates between the pump oil paths 27, 28, and the merging valve 32 is configured to switch from a blocking position N that blocks the discharging oil of the hydraulic pumps P1 and P2 to a merging position X that merges the discharging oil of the hydraulic pumps P1 and P2 based on a control command from the controller 20. Then, in the state where the merging valve 32 is located in the merging position X, the discharge oil of the hydraulic pumps P1 and P2 merges and is supplied to the control valve 11, and to the control valves 12 to 18 for other hydraulic actuators. It should be noted that the merging valve 32 is controlled to switch to the merging position X as necessary when adjusting the line relief setting pressure which will be described later, but during normal operation of the hydraulic shovel 1, for example, it is controlled to switch to the merging position N in order to ensure the driving straightness when the travel motor and the hydraulic actuator other than the travel motor are operated at the same time.

Figure 3:
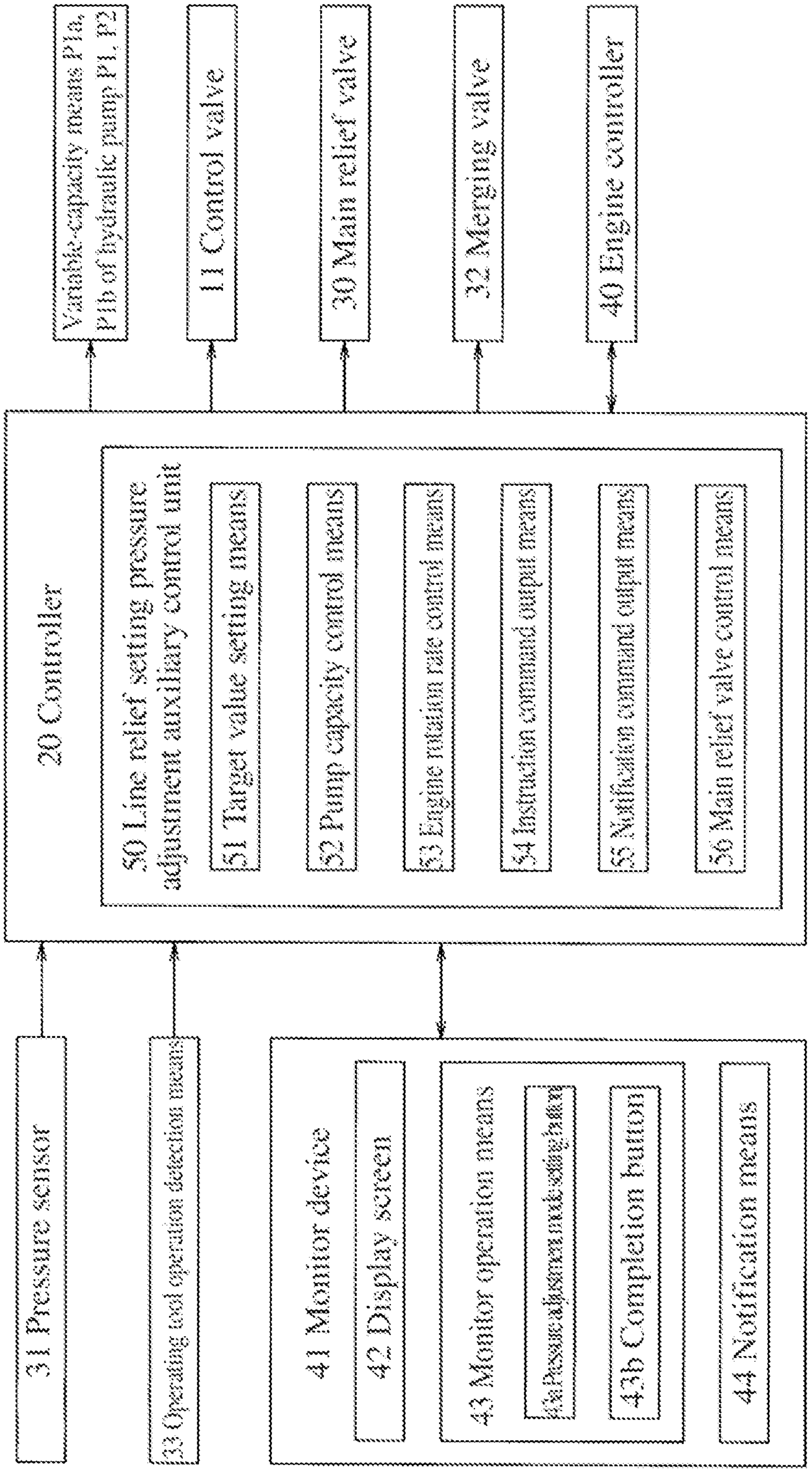
FIG. 3 is a block diagram illustrating input/output of controller.

On the other hand, as shown in FIG. 3, the controller 20 is connected to the input side, the pressure sensor 31, the operating tool operation detection means 33 for detecting the operation of the operating tool (operating lever, operating pedal, not shown) for the hydraulic actuator A, etc., and the variable-capacity means P1*a*, P2*a*, the control valve 11, the main relief valve 30, the merge valve 32, etc. of the hydraulic pump P1, P2, etc. are connected to the output side, and furthermore, the engine controller 40 controlling the engine E and the monitoring device 41 described later are connected to the input and output freely. Then, the controller 20 is provided with a line relief setting pressure adjustment auxiliary control unit 50 described later, and the line relief setting pressure auxiliary control unit 50 is configured to include various means such as a target value setting means 51 that sets the target relief setting pressure LRPt and the target flow rate Qt described later, a pump capacity control means 52 that controls the pump capacity of the hydraulic pumps P1 and P2, an engine rotation rate control unit 53 that controls an engine rotation rate, an instruction command output unit 54 that outputs an instruction command to the operator to the monitoring device 41 described later, a notification command output means 55 that outputs a notification command to the monitoring device 41, and a main relief valve control means 56 that outputs a control command for changing the relief setting pressure to the main relief valve 30. Using these various means 51 to 56, the line relief setting pressure auxiliary control unit 50 is configured to perform pressure adjustment auxiliary control to assist in the relief setting pressure adjustment operation of the line relief valve. It should be noted that the pump capacity control means 52 and the engine rotation rate control means 53 constitute the pump flow control means of the present invention. The controller 20 is also connected to the other hydraulic actuator and a detection means for detecting an operation tool operation for the other hydraulic actuator, but is omitted in the block diagram of FIG. 3. In addition, the block diagram of FIG. 3 shows only a portion related to the relief setting pressure adjustment auxiliary control of the line relief valve among the various controls performed by the controller 20, and the portion related to other controls is omitted.

In the present embodiment, the monitoring device 41 is provided in the cab of the hydraulic shovel 1, and includes a display screen 42 for displaying various information and instructions to the operator, a monitor operation means 43 such as a touch operation unit, an operation key, an operation button, and the like, and a notification means 44 such as sound (including audio) and light for notifying the operator, and one of the monitor operation means 43 is provided with a pressure adjustment mode setting button 43*a*, an end button 43*b*, etc. which will be described later. Note that the display screen 42 also functions as one of the notification means 44.

For the pressure adjustment auxiliary control performed by the line relief setting pressure adjustment auxiliary control unit 50 provided in the controller 20, a case of adjusting the relief setting pressure of the line relief valve 25 shown in FIG. 2 will be described based on FIGS. 4-7 for example.

Figure 4:
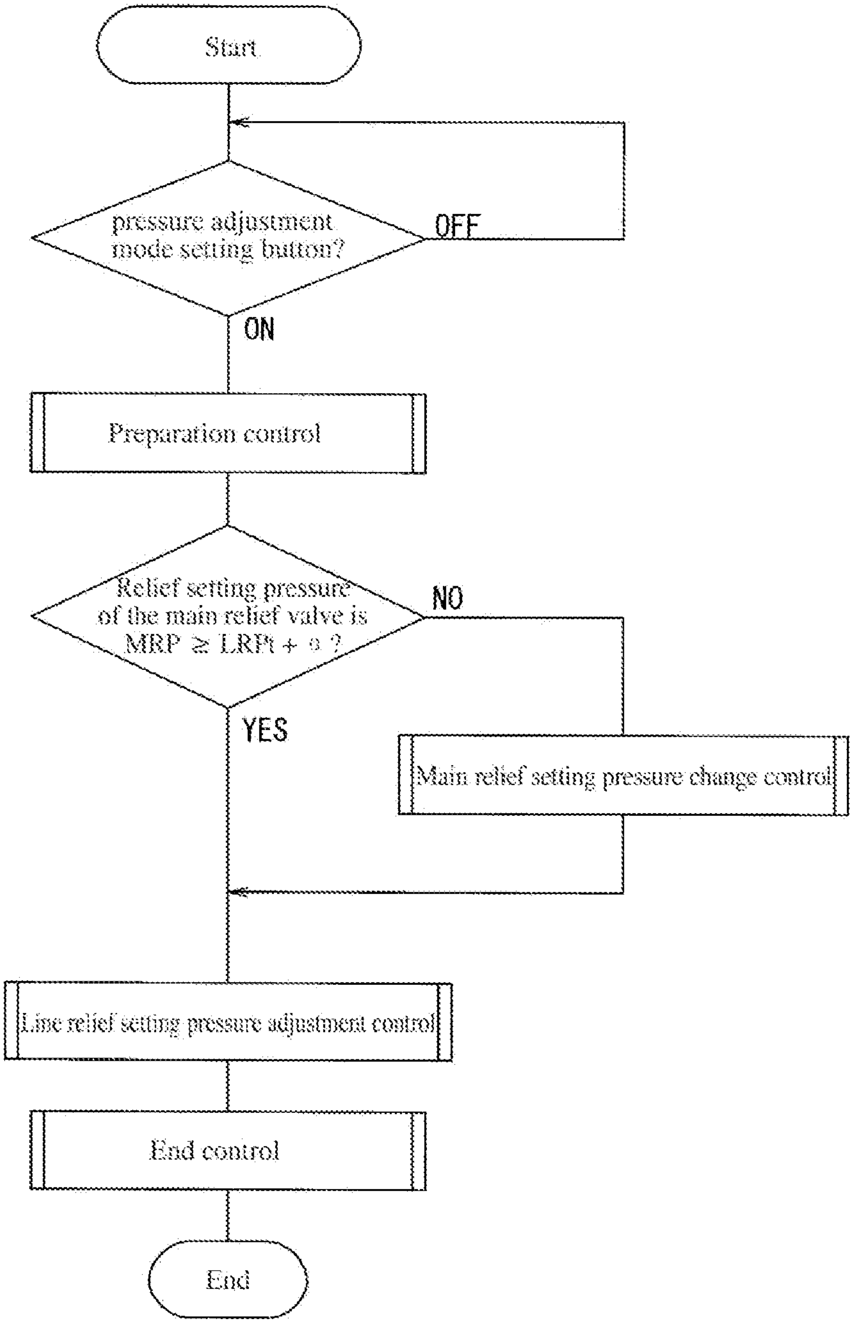
FIG. 4 is a flowchart illustrating a procedure for a main routine.

First, the main routine of the pressure adjustment auxiliary control is shown in FIG. 4, but when the main routine is started, it is first determined whether the pressure adjustment mode setting button 43*a* is "ON" or "off". The pressure adjustment mode setting button 43*a* is one of the monitoring operation means 43 provided in the monitoring device 41 as described above, and when the operator starts the line relief setting pressure adjustment operation, and the pressure adjustment mode setting button 43*a* is operated, the controller 20 becomes a pressure adjustment mode for performing pressure adjustment auxiliary control.

Then, if the pressure adjustment mode setting button 43*a* is "ON", firstly, the "preparation control" described later is executed. After the execution of the "preparation control", it is continuously determined whether or not the relief setting pressure MRP of the main relief valve 30 is higher than a predetermined pressure α (the predetermined pressure α is, for example, about 2 to 3 MPa) that is set in advance than the target relief setting pressure LRPt of the line relief valve 25. Then, "Yes", that is, in a case of a high pressure above the predetermined pressure α (MRP≥LRPt+α), the "line relief setting pressure adjustment control" described later is executed. On the other hand, in a case of "NO", that is, if the pressure is not higher than the predetermined pressure α (MRP<LRPt+α), the "main relief setting pressure change control" described later is executed, and then the "line relief setting pressure adjustment control" is executed. After the execution of the "line relief setting pressure adjustment control", the "end control" is performed and the main routine ends.

Figure 5:
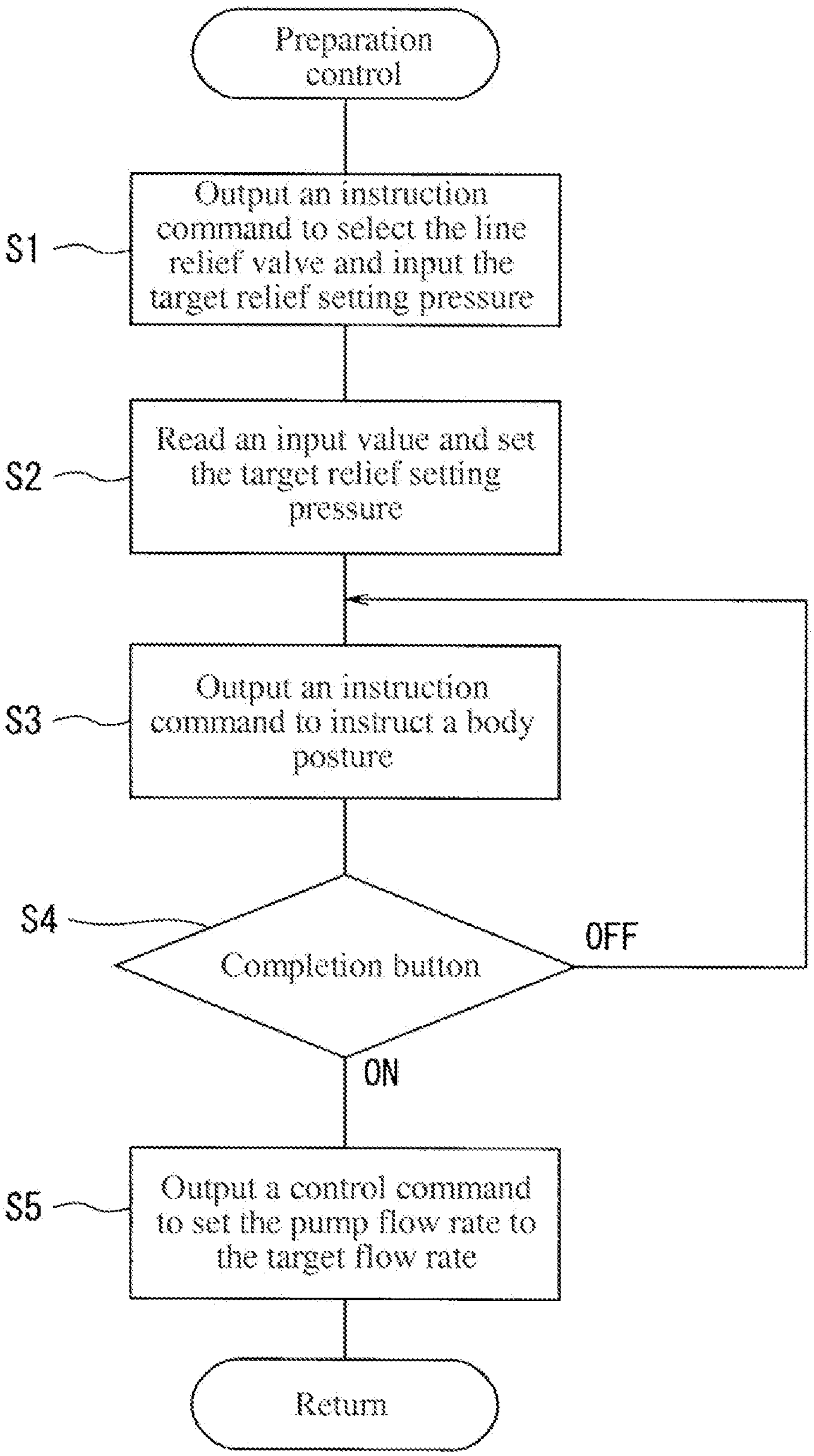
FIG. 5 is a flowchart illustrating a procedure for preparation control.

The "preparation control" will then be described based on FIG. 5.

In the "preparation control", the controller 20 (the line relief setting pressure adjustment auxiliary control unit 50 of the controller 20) first outputs an instruction command instructing the operator to select a line relief valve (in the present embodiment, the line relief valve 25) that performs the relief setting pressure adjustment operation and to input a relief setting pressure value (target relief setting pressure LRPt) as a target of the line relief valve 25 to the display screen 42 or the notification means 44 of the monitor device 41 (if the instruction command is output to the notification unit 44, the instruction to the operator is performed by voice. It applies to the followings.).

The operator, upon instruction from the controller 20, uses the monitoring operation means 43 to select the line relief valve 25 to perform the relief setting pressure adjustment operation and input the value of the target relief setting pressure LRPt.

On the other hand, the controller 20 reads the values of the selected line relief valve 25 and the target relief setting pressure LRPt input from the monitoring device 41 based on the operation of the operator and sets the target relief setting pressure LRPt (step S2).

Next, the controller 20 outputs to the display screen 42 or the notification means 44 of the monitor device 41 instruction commands instructing the operator to set a preset body posture (to prevent the hydraulic actuator A from unintentionally activating during the relief setting pressure adjustment operation, e.g., if the hydraulic actuator A is the bucket cylinder 10 and the line relief valve 25 is the relief valve for the head side actuator line of the bucket cylinder 10, the posture of extending the bucket cylinder 10 to the end) in response to the selected line relief valve 25 (step S3).

The operator is instructed by the controller 20 to operate the operation tool for the hydraulic actuator to the preset body posture and then operate "ON" the end button 43*b* which is one of the monitoring operation means 43.

On the other hand, the controller 20 determines whether an "on" operation of the end button 43*b* has been input from the monitoring device 41 (step S4), and if an "on" operation has been input, then controls the pump capacity of the hydraulic pump P1 and engine rotation rate such that the pump flow rate of the hydraulic pump P1 is a target flow rate Qt set in response to the line relief valve 25 (step S5). In this case, for each line relief valve, the target flow rate Qt that flows out of the line relief valve is determined, and the information is input to the controller 20 in advance. In addition, in controlling the target flow rate Qt, the controller 20 outputs a control command to fix the pump capacity to the minimum capacity for the variable capacity means P1*a* of the hydraulic pump P1, and calculates an engine rotation rate at which the pump flow rate becomes the target flow rate Qt when the pump capacity is the minimum capacity, and outputs a control command to the engine controller 40 so that the engine rotation rate becomes the engine rotation rate. Furthermore, in this case, if it is calculated that the pump flow rate of the hydraulic pump P1 alone is insufficient to the target flow rate Qt, a control command is output to switch to the merging position X in the merging valve 32 in order to merge the pump flow rates of both the hydraulic pumps P1 and P2 to supply the target flow rate Qt. In this case, a control command is output to fix the pump capacity to the minimum capacity for both the variable-capacity means P1*a* and P2*a* of the hydraulic pumps P1 and P2, and at the same time, an engine rotation rate at which the total pump flow rate becomes the target flow rate Qt is calculated when the pump capacity of both the hydraulic pumps P1 and P2 is the minimum capacity, and a control command is output to the engine controller 40 to make it become the engine rotation rate. Then, by controlling the pump flow rate of the hydraulic pump P1 or the total pump flow rate of the hydraulic pumps P1 and P2 to the target flow rate Qt in this way, the "preparation control" ends, and according to the relief setting pressure MRP of the main relief valve 30 as described above, it transitions to the "main relief setting pressure change control" or "line relief setting pressure adjustment control".

Figure 6:
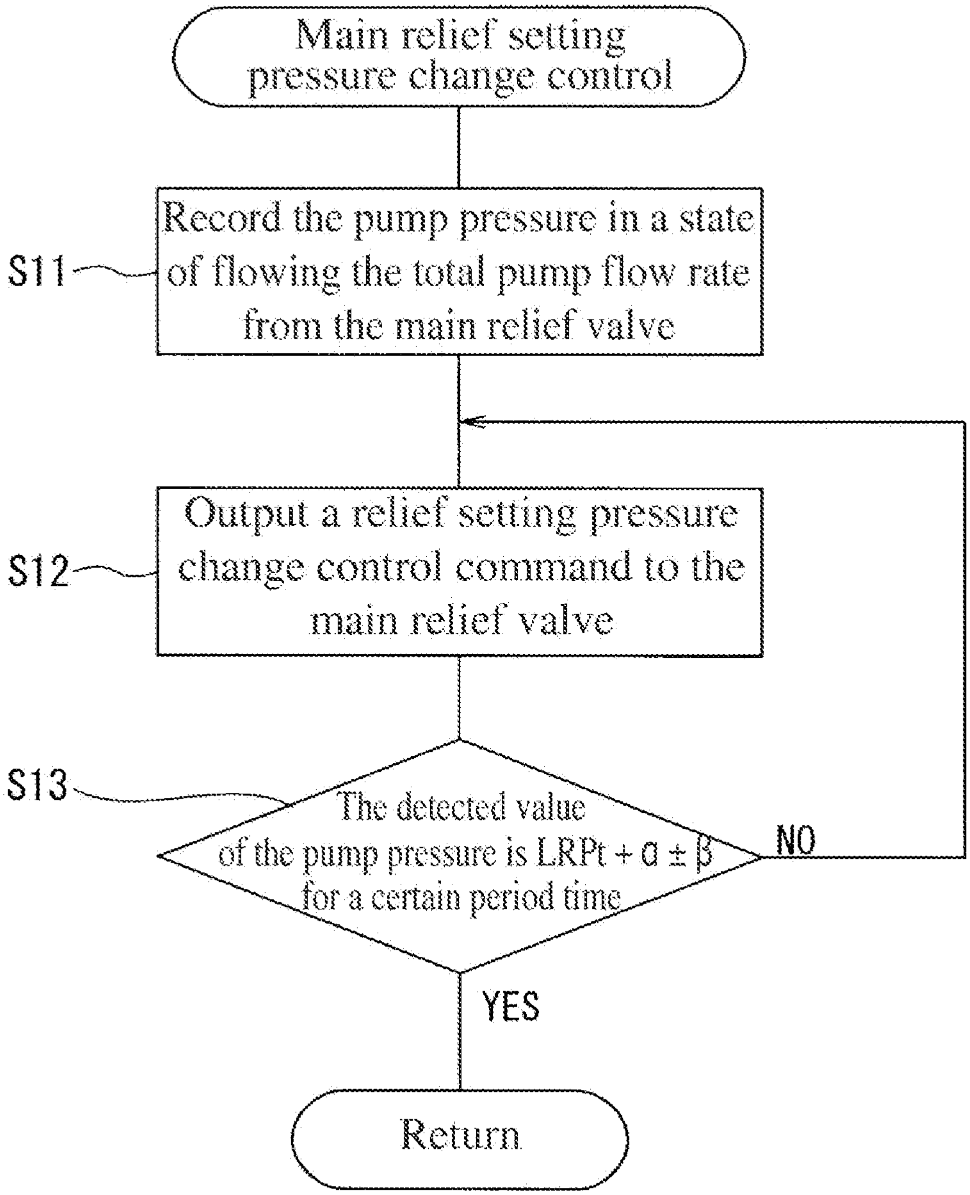
FIG. 6 is a flowchart illustrating a procedure for main relief setting pressure change control.

The "main relief setting pressure change control" will then be described based on FIG. 6. The "main relief setting pressure change control" is controlled to be implemented, as described above, if the relief setting pressure MRP of the main relief valve 30 is not high pressure which is higher than the target relief setting pressure LRPt of the line relief valve 25 by predetermined pressure α set in advance (MRP<LRPt+α), that is, the differential pressure between the relief setting pressure MRP of the main relief valve 30 and the target relief setting pressure LRPt of the line relief valve 25 is less than the predetermined pressure α (MRP−LRPt<α), and this is a control that the target relief setting pressure LRPt of the relief valve 25 is higher than the target relief setting pressure LRPt by only the predetermined pressure α set in advance, in order to prevent the main relief valve 30 from leaking forward when the setting pressure adjustment operation of the line relief valve 25 occurs because the differential pressure between the relief setting pressure MRP of the main relief valve 30 and the target relief setting pressure LRPt of the line relief valve 25 is too small.

In the "main relief setting pressure change control", first, various valves connected to the pump oil paths 27 and 28 are controlled so that the total pump flow of the hydraulic pumps P1 and P2 flows to the oil tank T via the main relief valve 30. In the schematic hydraulic circuit diagram shown in FIG. 2, by positioning the control valves 11 and the control valves 12-18 for other hydraulic actuators in the neutral position N, the total discharge flow rate of the hydraulic pumps P1 and P2 is caused to flow out of the main relief valve 30, but for example, the control valve is controlled to actuate a valve that closes the center line if the control valve is of the open center mode. Then, with the total pump flow of the hydraulic pumps P1 and P2 flowing out of the main relief valve 30 in this way, the pump pressure detected by the pressure sensor 31 is recorded (step S11).

Next, the controller 20 outputs a control command of relief setting pressure change to the main relief valve 30 so that the relief setting pressure is higher than the target relief setting pressure LRPt of the line relief valve by the predetermined pressure α (step 12).

Then, it is determined whether the detected value of the pump pressure input from the pressure sensor 31 falls within a predetermined range (LRPt+α±β) of pressure which is higher than the target relief setting pressure LRPt of the line relief valve by the predetermined pressure α for a certain period of time (step 13). If it falls, the "main relief setting pressure change control" is ended and transitions to the "line relief setting pressure adjustment control". Said Bis preset, for example, at about 0.3 MPa, depending on the value of the predetermined pressure α.

Figure 7:
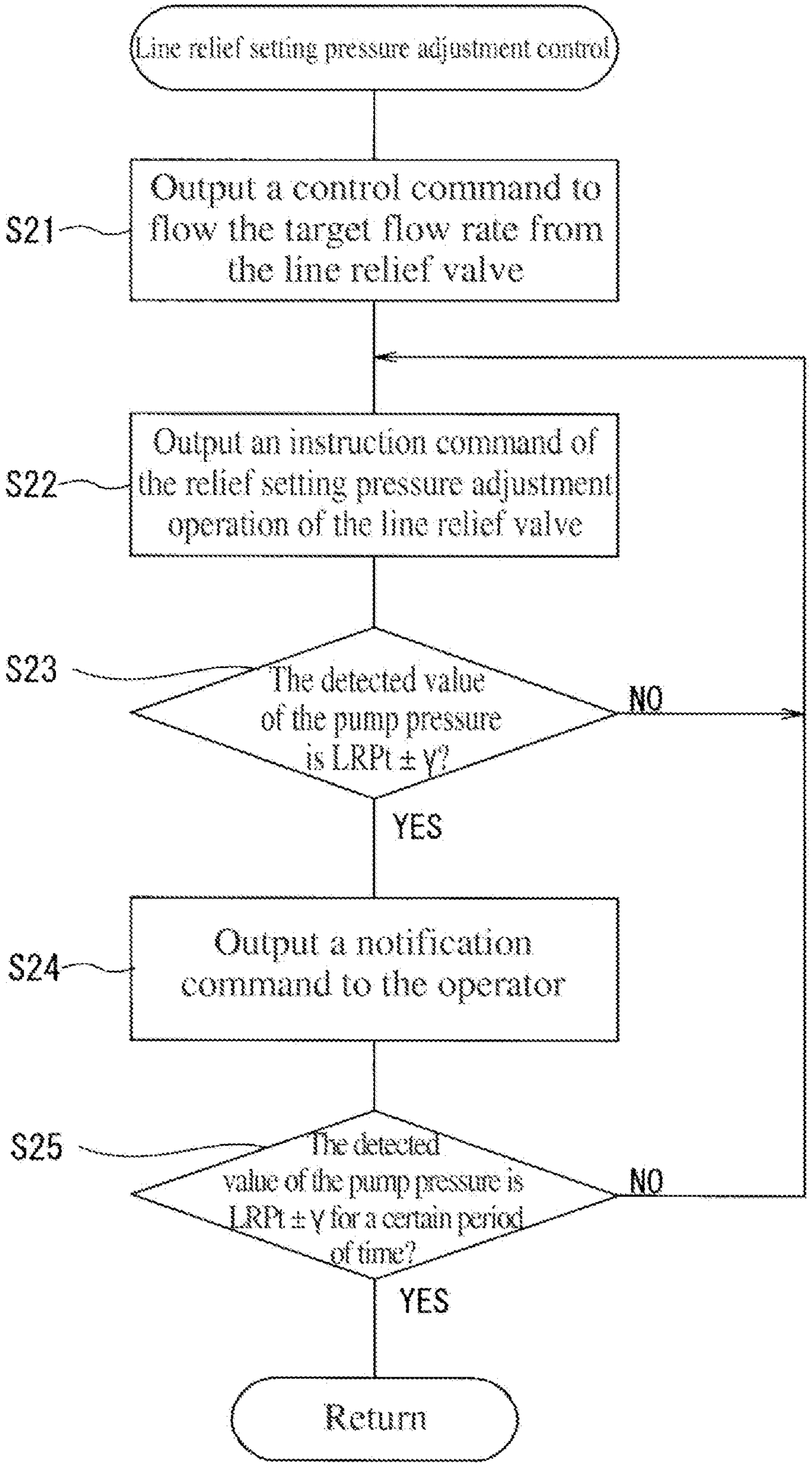
FIG. 7 is a flowchart illustrating a procedure for line relief setting pressure adjustment control.

The "line relief setting pressure adjustment control" will then be described based on FIG. 7. In the "line relief setting pressure adjustment control", the control valve 11 is first switched to the operating position X to connect the hydraulic pump P1 and the line relief valve 25, so that the total pump flow rate of the hydraulic pump P1 flows from the line relief valve 25 to the oil tank T (step S21). In this case, the pump flow rate of the hydraulic pump P1 is controlled to be the target flow rate Qt by the aforementioned "preparation control", so that the target flow rate Qt passes through the line relief valve 25 and flows to the oil tank T. In the state where the merging valve 32 is located in the merging position X, the total pump flow rate of the hydraulic pumps P1 and P2 flows from the line relief valve 25 to the oil tank T, but it will be explained here that the merging valve 32 is located in the blocking position N.

The controller 20 then outputs an instruction command to the display screen 42 or the notification means 44 of the monitoring device 41 instructing the operator to perform the adjustment operation of the relief setting pressure of the line relief valve 25 by manual operation (step S22).

The operator receives the instructions from the controller 20 and adjusts the relief setting pressure of the line relief valve 25 by manually turning the adjustment handle.

On the other hand, the controller 20 monitors the detected value of the pressure sensor 31 to determine whether the pump pressure has fallen within a predetermined range (LRPt±γ) of the target relief setting pressure LRPt of the line relief valve 25 (step 23), and if so, outputs a notification command to the notification means 44 to notify the operator (step S24). The notification in this case is made with sound or light by the notification means 44 so that the operator can see even if it is away from the monitoring device 41. Said γ is preset, for example, in an order of 0.3 MPa, depending on each line relief valve.

The operator stops adjusting the relief setting pressure of the line relief valve 25 upon notification from the controller 20.

Furthermore, the controller 20 determines whether the pump pressure falls within a predetermined range of the target relief setting pressure LRPt of the line relief valve 25 (LRPt±γ) for a certain period of time, and if so, ends the "line relief setting pressure adjustment control" and transitions to the end control.

In the "end control", the controller 20 cancels all control commands output in the pressure adjustment auxiliary control, such as control commands to the main relief valve 30, control valves 11, control commands to the control valves 12 to 18 for other hydraulic actuators, control commands to the variable-capacity means P1*a*, P2*a* of the hydraulic pump P1, P2, control commands to the engine controller 40, and the like, and ends the pressure adjustment auxiliary control.

However, the controller 20 performs "preparation control", "main relief setting pressure change control" (only if necessary), "line relief setting pressure adjustment control", and "end control" sequentially, while the operator can perform the relief setting pressure adjustment operation of the line relief valve 25 with good accuracy independently by performing the selection of the line relief valve 25, the input of the target relief setting pressure LRPt, the relief setting pressure change operation of the main relief valve 30 (only if necessary), and the relief setting pressure adjustment operation of the line relief valve 25 upon receiving instructions from the controller 20.

In the present embodiment configured as described, the hydraulic system of the hydraulic shovel 1 comprises a variable-capacity hydraulic pump P1, a hydraulic actuator A making the hydraulic pump P1 as a hydraulic source, a control valve 11 arranged in an oil supply path from the hydraulic pump P1 to the hydraulic actuator A to control the oil supply to the hydraulic actuator A, and a manual line relief valve 25 that can adjust the relief setting pressure by manual operation and is arranged in the line relief oil path 23 to the oil tank T and formed by branching from the actuator line 21 which extends from the control valve 11 to the hydraulic actuator A.

In addition, the controller 20 is provided to performs the control that assists in the adjustment of the relief setting pressure of the line relief valve 25 by manual operation and a pressure sensor 31 is provided to detect the pump pressure of the hydraulic pump P1 and output the detected pump pressure to the controller 20. The controller 20 is provided with a target value setting means 51 for setting the target relief setting pressure LRPt and the target flow rate Qt of the line relief valve 25, a pump flow rate control means (a pump capacity control means 52 and an engine rotation rate control means 53) for controlling the pump flow rate of the hydraulic pump P1 to discharge the target flow rate QT from the line relief valve 25 during the relief setting pressure adjustment operation of the line relief valve 25, an instruction command output means 54 for instructing perform of relief setting pressure adjustment operation of the line relief valve 25 by an manual operation, and a notification command output means 55 for notifying that the pump pressure input from the pressure sensor 31 is within a predetermined range of the target relief set pressure LRPt during the relief setting pressure adjusting work.

Thus, in the present embodiment, the controller 20 is provided to assist in the relief setting pressure adjustment operation of the line relief valve 25 by the manual operation, and the controller 20 notifies that when the control of the flow rate (target flow rate Qt) flowing out of the line relief valve 25 during the relief setting pressure adjustment operation is performed by the controller 20, and when the operator performs the relief setting pressure adjustment operation according to the instructions of the controller 20, the pump pressure is within a predetermined range of the target relief setting pressure LRPt, that is, the adjustment of the relief setting pressure of the line relief valve 25 is completed. As a result, the relief set pressure adjustment operation of the line relief valve 25 can be easily performed individually, thereby greatly contributing to the improvement of the working efficiency of the adjustment operation, and the adjusted relief setting pressure is the same without deviation due to the operator, thereby contributing to the improvement of the accuracy of the relief setting pressure adjustment of the line relief valve.

In addition, the hydraulic system of the hydraulic shovel 1 is provided with a main relief valve 30 formed by branching from the pump oil path 27 from the hydraulic pump P1 to the control valve 11 and disposed in the main relief oil path 29 to the oil tank T, and by the main relief valve control means 56 provided in the controller 20, the relief setting pressure of the main relief valve 30 during the relief setting pressure adjustment operation of the line relief valve 25 is controlled to be higher than the target relief setting pressure LRP of the line relief valve 25 by the predetermined pressure α or more. This ensures to prevent that when performing the setting pressure adjustment operation of the line relief valve 25, the difference pressure between the relief setting pressure of the main relief valve 30 and the target relief setting pressure LRPt of the line relief valve 25 is too small, so that the main relief valve 30 leaks beforehand.

Further in this case, the controller 20 comprises a pump capacity control means 52 for controlling the pump capacity of the hydraulic pumps P1 and P2, and an engine rotation rate control means 53 for controlling the rotation rate of the engine E that serves as the driving source of the hydraulic pumps P1 and P2, and the pump flow rate control means controls the pump flow rate of the hydraulic pumps P1 and P2 by adjusting the engine rotation rate by the engine rotation rate control means 53 with the capacity of the hydraulic pumps P1 and P2 fixed to the minimum capacity during the relief setting pressure adjustment operation of the line relief valve 25. This makes it possible to accurately perform pump flow control to discharge the target flow rate Qt from the line relief valve 25 during the relief setting pressure adjustment operation of the line relief valve 25, which can greatly contribute to improving the accuracy of the relief setting pressure adjustment.

In addition, in the present embodiment, the hydraulic system of the hydraulic shovel 1 is provided with a plurality of hydraulic pumps P1 and P2 (in the present embodiment, two hydraulic pumps), and the controller 20 controls the merging and supplying of the pump flows of the plurality of hydraulic pumps P1 and P2 to the line relief valve 25 during the relief setting pressure adjustment operation in accordance with the target flow rate Qt that flows out of the line relief valve 25 during the relief setting pressure adjustment operation. This makes it possible to carry out the relief setting pressure adjustment operation without hindrance even if the target flow rate Qt to flow out of the line relief valve 25 is large.

It should be noted that the present invention is not limited to the above embodiment (the first embodiment). In the first embodiment, as the main relief valve, an electromagnetic relief valve that can change the relief setting pressure with a control command from the controller is used, but even if a manual relief valve that can manually change the relief setting pressure is used as the main relief valve (the second embodiment), the present invention can be implemented.

Figure 8:
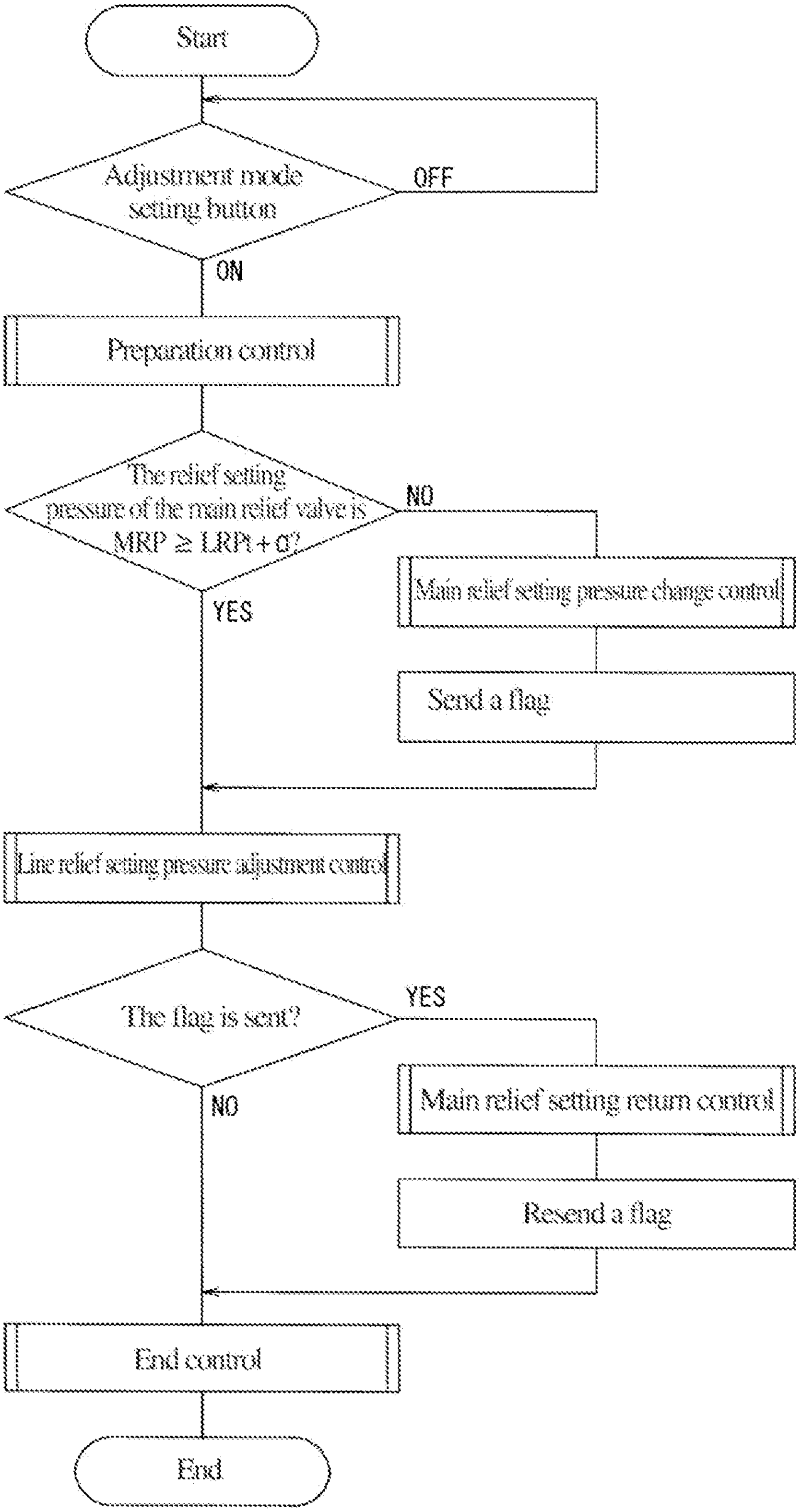
FIG. 8 is a flowchart illustrating a procedure for main routine in a second embodiment.

Although the flowchart diagram of the main routine of the pressure adjustment assistance control performed in the second embodiment is shown in FIG. 8, in the main routine of the second embodiment, in a case that the control of performing the "main relief setting pressure change control" and the "main relief setting pressure return control" are performed, it is different from the first embodiment in that the "main relief setting pressure return control" is performed before the perform of the "end control", and other "preparation control", "line relief setting pressure adjustment control", and "end control" are similar to the first embodiment. Therefore, the "main relief setting pressure change control" and the "main relief setting pressure return control" are described below.

Figure 9:
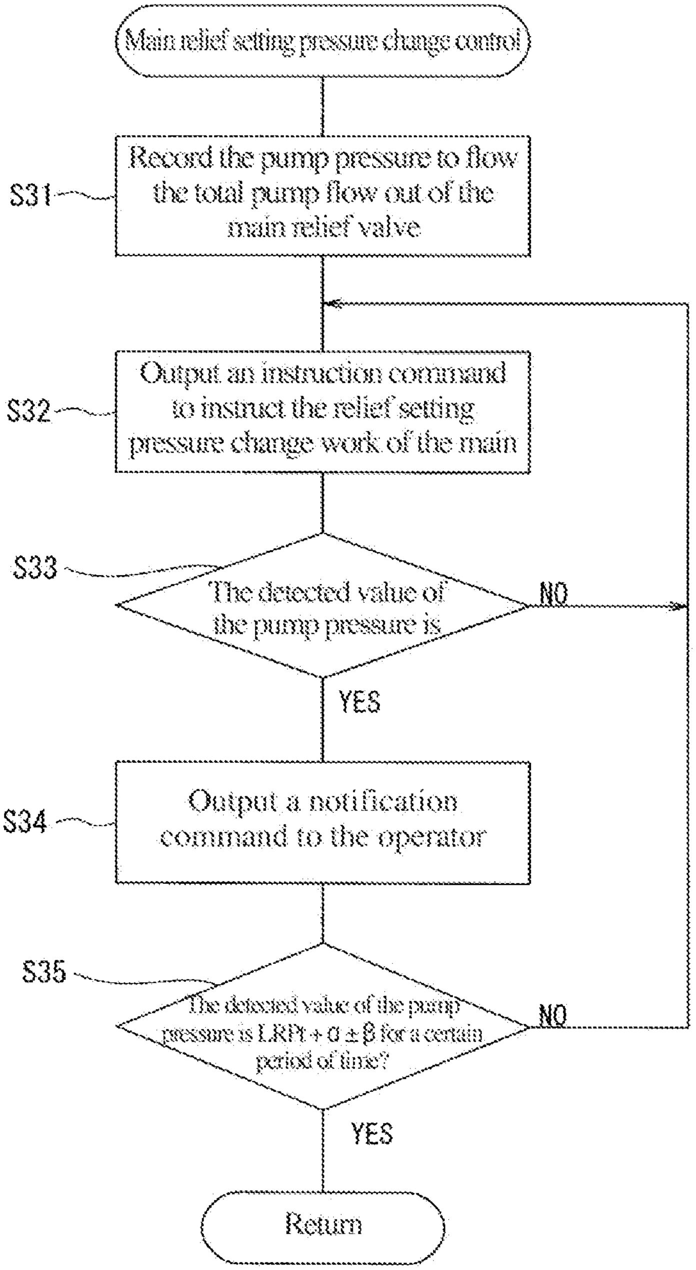
FIG. 9 is a flowchart illustrating a procedure for main relief setting pressure change control in a second embodiment.

The "main relief setting pressure change control" in the second embodiment will be described below with reference to FIG. 9. The "main relief setting pressure change control", similar to the "main relief setting pressure change control" of the first embodiment, is the control for making the relief setting pressure MRP of the main relief valve 30 higher than the target relief setting pressure LRPt of the line relief valve 25 by the predetermined pressure α set in advance. First, the controller 20 records the pump pressure detected by the pressure sensor 31 with the total pump flow of the hydraulic pumps P1 and P2 flowing out of the main relief valve 30, as in the case of the first embodiment (step S31).

Next, the controller 20 outputs an instruction command to instruct the operator the change work of the relief setting pressure of the main relief valve 30 by the manual operation to the display screen 42 or the notification means 44 of the monitoring device 41 (step S32).

The operator, upon instruction from the controller 20, manually turns the adjustment handle to change the relief setting pressure of the main relief valve 30.

On the other hand, the controller 20 monitors the detected value of the pressure sensor 31 to determine whether the pump pressure falls within a predetermined range (LRPt+α±β) of the pressure which is higher than the target relief setting pressure LRPt of the line relief valve 25 by the predetermined pressure α (step 33), and if it falls within the predetermined range, outputs a notification command to the notification means 44 to notify the operator (step S34). The notification in this case, as in the first embodiment, is carried out with sound or light by the notification means 44, as can be seen even if the operator is away from the monitoring device 41.

The operator stops the change work of the relief setting pressure of the main relief valve 30 upon notification from the controller 20.

Furthermore, the controller 20 determines whether the detected value of the pump pressure is within a predetermined range (LRPt+α±β) of pressure higher than the target relief setting pressure LRPt of the line relief valve 25 by the predetermined pressure α for a certain period of time, and if it is, terminates the "main relief setting pressure change control".

Figure 10:
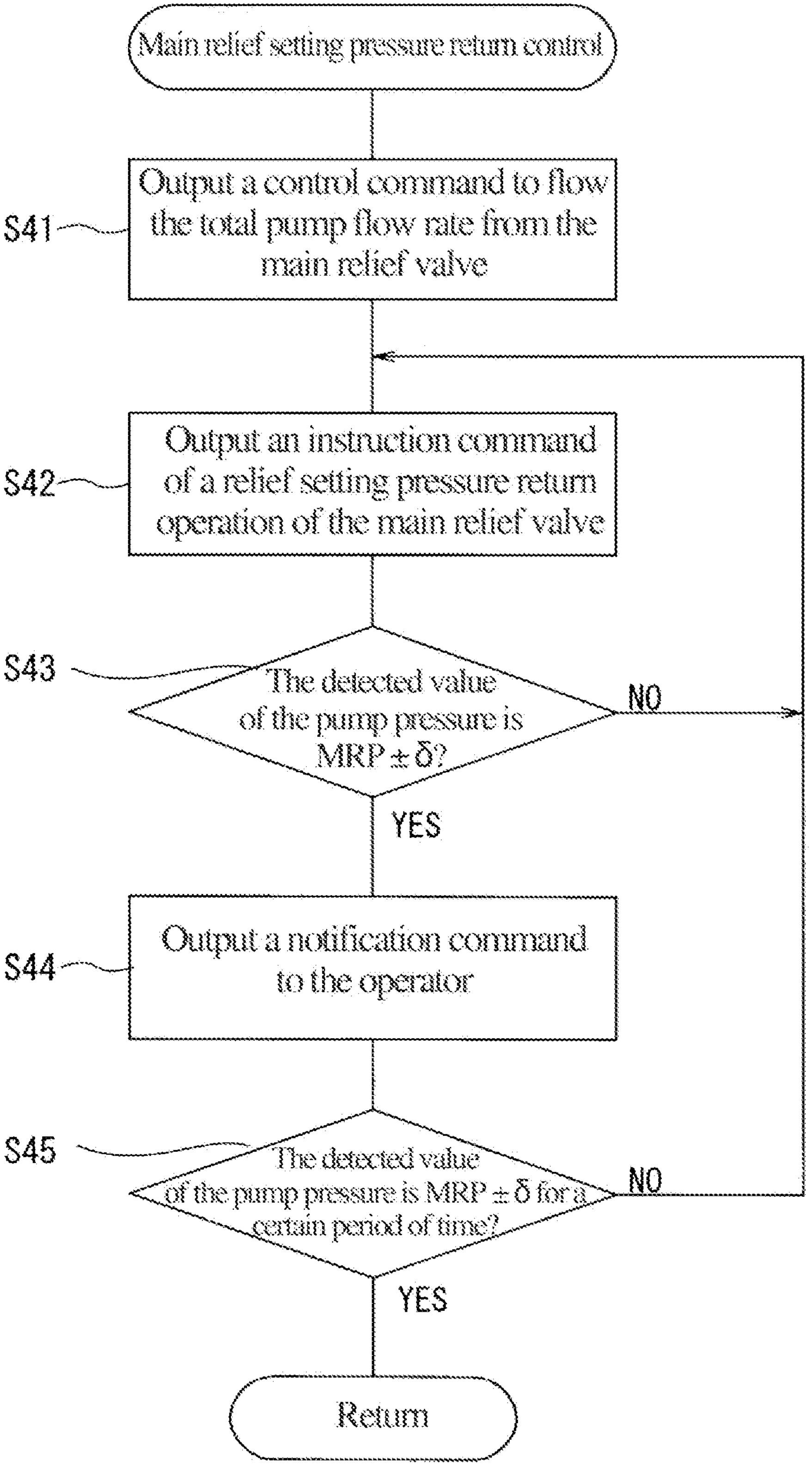
FIG. 10 is a flowchart illustrating a procedure for main relief setting pressure return control in a second embodiment.

Next, the "main relief setting pressure return control" of the second embodiment will be described below with reference to FIG. 10. The "main relief setting pressure return control" is the control that is performed only when the "main relief setting pressure change control" is executed in the second embodiment, and is performed to return the relief setting pressure of the main relief valve 30 to the relief setting pressure before the "main relief setting pressure change control" is implemented.

In the "main relief setting pressure return control", as in the "main relief setting pressure change control", first, the control is performed to cause the total pump flow of the hydraulic pumps P1 and P2 to flow out of the main relief valve 30 (step S41).

Next, the controller 20 outputs an instruction command to the display screen 42 or the notification means 44 of the monitoring device 41 to change the relief setting pressure of the main relief valve 30 by manual operation and instruct the operator to return to the relief setting pressure before the execution of the "main relief setting pressure change control" (step S32).

The operator, upon instruction from the controller 20, manually turns the adjustment handle to change the relief setting pressure of the main relief valve 30.

On the other hand, the controller 20 monitors the detected value of the pressure sensor 31 to determine whether the pump pressure has entered a predetermined range (MRP±8) of the pressure stored in step S31 of the "main relief setting pressure change control" (step S43), and if it has entered the predetermined range, outputs a notification command to the notification means 44 to notify the operator (step S44). Said 8 delta is preset, for example, in an order of 0.3 MPa, depending on the main relief valve 30.

The operator stops the return work of the relief setting pressure of the main relief valve 30 upon notification from the controller 20.

In addition, the controller 20 determines whether the detected value of the pump pressure falls within a predetermined range of the stored pressure (MRP±δ) for a certain period of time, and if it does, terminates the "main relief setting pressure return control".

In the second embodiment configured in this manner, since the main relief valve 30 is manually operated, when it is necessary to change the main relief setting pressure during the relief setting pressure adjustment operation of the line relief valve 25 (when the relief setting pressure MRP of the main relief valve 30 is not higher than the target relief setting pressure LRPt of the line relief valve 25 by the predetermined pressure α or more), the relief setting pressure change operation of the main relief valve 30 is performed by a manual operation. But even in this case, the instruction command for the relief setting pressure change operation is output from the controller 20 and the controller 20 notifies the main relief valve 30 that the relief set pressure change of the main relief valve 30 has been completed. As a result, the relief setting pressure change operation of the main relief valve 30 by the manual operation can also be easily performed alone.

Furthermore, in the first and second embodiments, the monitoring device 41 is used when giving instructions and notifications to the operator from the controller, but it is also possible to, by wireless or wired, connect a mobile terminal (smartphone, tablet, laptop, etc.) held by the operator to the controller to give instructions and notifications via the mobile terminal. Furthermore, in this case, by replacing the monitor operation means and enabling input from the mobile terminal to the controller, the convenience is further improved.

INDUSTRIAL APPLICABILITY

This invention is available for use in adjusting the relief setting pressure of the manual line relief valve provided in the hydraulic control system of working machine such as hydraulic shovel.

What is claimed is:

1. A relief setting pressure adjustment system in a hydraulic system of a work machine, comprising:

a variable capacity hydraulic pump;

a hydraulic actuator using the hydraulic pump as a hydraulic supply source;

a control valve arranged in an oil supply path from the hydraulic pump to the hydraulic actuator to control oil supply to the hydraulic actuator;

a line relief valve arranged in a line relief oil path extending to an oil tank, wherein the line relief oil path branches from an actuator line that extends from the control valve to the hydraulic actuator;

a controller that prompts a relief setting pressure adjustment of the line relief valve by a manual operation; and a pressure sensor that detects pump pressure of the hydraulic pump and outputs the detected pump pressure to the controller;

wherein the controller sets a target relief setting pressure and a target flow rate of the line relief valve, controls a pump flow rate of the hydraulic pump to discharge from the line relief valve at the target flow rate during the relief setting pressure adjustment of the line relief valve, instructs an operator to perform the relief setting pressure adjustment of the line relief valve by the manual operation, and notifies that a pump pressure input from the pressure sensor is within a predetermined range of the target relief setting pressure during the relief setting pressure adjustment;

wherein the controller controls a pump capacity of the hydraulic pump and controls an engine rotation rate which is a driving source of the hydraulic pump, and the pump flow rate of the hydraulic pump is thereby controlled by adjusting the engine rotation rate in a state in which a capacity of the hydraulic pump is fixed to a minimum capacity at the relief setting pressure adjustment of the line relief valve.

2. The relief setting pressure adjustment system according to claim 1, characterized in that, the hydraulic system of the work machine further comprises a main relief valve formed by branching from a pump oil path that extends from the hydraulic pump to the control valve and arranged in a main relief oil path to the oil tank, and the controller controls a relief setting pressure of the main relief valve to be higher than the target relief setting pressure of the line relief valve by a predetermined pressure or more during the relief setting pressure adjustment of the line relief valve.

3. The relief setting pressure adjustment system according to claim 1, characterized in that, the hydraulic system of the work machine comprises a plurality of hydraulic pumps, and the controller merges a pump flow of the plurality of hydraulic pumps to the line relief valve when performing the relief setting pressure adjustment according to the target flow rate of the line relief valve.

* * * * *